United States Patent
Alon et al.

(10) Patent No.: US 10,635,958 B2
(45) Date of Patent: Apr. 28, 2020

(54) HYBRID VISUAL TAGGING USING CUSTOMIZED COLORED TILES

(71) Applicant: SODYO LTD., Binyamina (IL)

(72) Inventors: Alex Alon, Binyamina (IL); Irina Alon, Binyamina (IL); Eran Katz, Ramat-Hasharon (IL); Sven Bergmann, Sawston (GB)

(73) Assignee: SODYO LTD., Binyamina (IL)

( * ) Notice: Subject to any disclaimer, the term of this patent is extended or adjusted under 35 U.S.C. 154(b) by 126 days.

(21) Appl. No.: 15/546,386

(22) PCT Filed: Jan. 25, 2016

(86) PCT No.: PCT/IB2016/050354
§ 371 (c)(1),
(2) Date: Jul. 26, 2017

(87) PCT Pub. No.: WO2016/120776
PCT Pub. Date: Aug. 4, 2016

(65) Prior Publication Data
US 2018/0018547 A1 Jan. 18, 2018

Related U.S. Application Data

(60) Provisional application No. 62/108,545, filed on Jan. 28, 2015.

(51) Int. Cl.
*G06K 19/06* (2006.01)
*G06T 7/90* (2017.01)
(Continued)

(52) U.S. Cl.
CPC ... *G06K 19/06037* (2013.01); *G06K 19/0614* (2013.01); *G06K 19/06046* (2013.01);
(Continued)

(58) Field of Classification Search
CPC ....... G06K 19/06037; G06K 19/06046; G06K 19/06103; G06K 19/0614; G06K 7/1417; G06T 7/90; H04W 4/025
See application file for complete search history.

(56) References Cited

U.S. PATENT DOCUMENTS 5,576,528 A 11/1996 Chew et al.
5,869,828 A 2/1999 Braginsky
(Continued)

FOREIGN PATENT DOCUMENTS

EP 1870858 A2 12/2007
EP 2068117 A2 6/2009
(Continued)

OTHER PUBLICATIONS

U.S. Appl. No. 15/039,040 office action dated Jun. 14, 2018.
(Continued)

*Primary Examiner* — Michelle M Entezari
(74) *Attorney, Agent, or Firm* — Kligler & Associates Patent Attorneys Ltd

(57) ABSTRACT

A method for information display includes specifying information pertaining to a target location and encoding the specified information in a machine-readable symbol (22, 60) comprising a set of three or more color elements (40), which have different, respective colors that encode a first part of the information and are contained within a non-rectangular border (44), which has a shape characteristic that encodes a second part of the information. The symbol is positioned in the target location.

10 Claims, 3 Drawing Sheets

(51) Int. Cl.
*G06K 7/14* (2006.01)
*H04W 4/02* (2018.01)

(52) U.S. Cl.
CPC ..... *G06K 19/06103* (2013.01); *G06K 7/1417* (2013.01); *G06T 7/90* (2017.01); *H04W 4/025* (2013.01)

(56) References Cited

U.S. PATENT DOCUMENTS

| | | | |
|---|---|---|---|
| 6,070,805 | A | 6/2000 | Kaufman et al. |
| 7,020,327 | B2 | 3/2006 | Tack-Don et al. |
| 7,243,024 | B2 | 7/2007 | Endicott |
| 7,505,849 | B2 | 3/2009 | Saarikivi |
| 7,511,736 | B2 | 3/2009 | Benton |
| 7,516,421 | B2 | 4/2009 | Asano et al. |
| 7,619,990 | B2 | 11/2009 | Alicherry et al. |
| 7,936,901 | B2 | 5/2011 | Jancke |
| 9,437,046 | B2 | 9/2016 | Alon et al. |
| 2002/0159081 | A1 | 10/2002 | Zeng |
| 2003/0026608 | A1 | 2/2003 | Malloy Desormeaux |
| 2004/0020989 | A1 | 2/2004 | Muramatsu |
| 2006/0013502 | A1 | 1/2006 | Weigand |
| 2007/0051813 | A1 | 3/2007 | Kiuchi et al. |
| 2007/0152060 | A1* | 7/2007 | Kiliccote ............ G06K 7/1443 235/462.09 |
| 2008/0137912 | A1 | 6/2008 | Kim et al. |
| 2008/0143482 | A1* | 6/2008 | Shoarinejad ........... G01S 7/003 340/10.1 |
| 2009/0148037 | A1 | 6/2009 | Moriyama et al. |
| 2011/0128288 | A1 | 6/2011 | Petrou et al. |
| 2011/0178708 | A1 | 7/2011 | Zhang et al. |
| 2011/0303746 | A1* | 12/2011 | Learmonth ........ G01N 21/3563 235/380 |
| 2012/0039529 | A1* | 2/2012 | Rujan .................. G06K 7/1417 382/164 |
| 2012/0063682 | A1 | 3/2012 | Alacoque |
| 2012/0249807 | A1 | 10/2012 | Sugden |
| 2012/0274775 | A1 | 11/2012 | Reiffel |
| 2014/0144996 | A1* | 5/2014 | Friedman ......... G06K 19/06037 235/494 |
| 2015/0363916 | A1 | 12/2015 | Botzas |
| 2016/0188938 | A1* | 6/2016 | Summerfield ....... G06K 9/3216 235/439 |
| 2016/0283763 | A1* | 9/2016 | Hosokane ........ G06K 19/06037 |
| 2017/0025088 | A1 | 1/2017 | Alon et al. |

FOREIGN PATENT DOCUMENTS

| | | |
|---|---|---|
| JP | 2008134989 A | 6/2008 |
| WO | 01/86582 A1 | 11/2001 |
| WO | 2010115464 A1 | 10/2010 |
| WO | 2012022678 A1 | 2/2012 |
| WO | 2012120524 A2 | 9/2012 |
| WO | WO-2015022538 A1 * | 2/2015 ........... G06K 9/3216 |

OTHER PUBLICATIONS

Guru et al., "Non-parametric adaptive region of support useful for corner detection: a novel approach", Pattern Recognition, vol. 37, issue 1, pp. 165-168, Jan. 2004.

Specification of sRGB, specified in IEC 61966-2-1, 2 pages, year 1999.

Carey, B., "E3 2012: Year of the second screen with Xbox Smart Glass and Wii U", 3 pages, Jun. 4, 2012 (http://news.cnet.com/8301-33692_3-57446945-305/e3-2012-year-of-the-second-screen-with-xbox-smart-glassand-wii-u/).

Paliath, P., "Xbox SmartGlass Announced, The 'Second Screen' for Your Xbox 360, Allows AirPlay-like Streams to iOs,Android, Windows Phone", 1 page, Jun. 5, 2012.

Biggs, J., "Microsoft Introduces Second-Screen Feature", 1 page, Jun. 4, 2012 (http://techcrunch.com/2012/06/04/microsoft-introduces-second-screen-feature-xbox-smartglass/).

Warren, C., "Xbox SmartGlass Brings the Second Screen to Games and Videos", 1 page, Jun. 4, 2012.

Moravec, H.P., "Obstacle Avoidance and Navigation in the Real World by a Seeing Robot Rover", Technical Report CMU-RI-TR3, Robotics Institute, Carnegie-Mellon University, USA, 175 pages, Sep. 2, 1980 (submitted as 2 attachments).

Shi et al., "Good Features to Track", 9th IEEE Conference on Computer Vision and Pattern Recognition, pp. 593-600, Jun. 21-23, 1994.

Tomasi et al., "Detection and Tracking of Point Features", Technical Report CMU-CS-91-132, 22 pages, Apr. 1991.

Harris et al., "A Combined Corner and Edge Detector", Proceedings of the 4th Alvey Vision Conference, pp. 147-151, Aug. 31-Sep. 2, 1988.

European Application # 14868144.8 Search Report dated Jun. 6, 2017.

European Application # 19158954.8 search report dated Apr. 29, 2019.

KR Application # 10-2014-7036780 office action dated Nov. 28, 2019.

EP Application # 14868144.8 office action dated Oct. 8, 2019.

U.S. Appl. No. 16/172,798 office action dated Nov. 13, 2019.

International Application # PCT/IB2019/055774 Search report dated Oct. 31, 2019.

* cited by examiner

HYBRID VISUAL TAGGING USING CUSTOMIZED COLORED TILES

CROSS-REFERENCE TO RELATED APPLICATION

This application claims the benefit of U.S. Provisional Patent Application 62/108,545, filed Jan. 28, 2015, which is incorporated herein by reference.

FIELD OF THE INVENTION

The present invention relates generally to methods, systems and software for image processing and display, and specifically to the use of machine-readable symbols in encoding and decoding of image information.

BACKGROUND

A wide variety of methods and standards are known in the art for encoding information in a form that can be read by a computer using an image sensor or other type of optical sensor. The best-known standards of this sort are barcodes, including the traditional one-dimensional arrays of stripes and two-dimensional barcodes, such as QR codes. Other types of image-based computer-readable encoding schemes and symbols use color information, rather than the monochrome symbols provided by conventional barcodes.

For example, PCT International Publication WO 2013/182963, whose disclosure is incorporated herein by reference, describes a method for encoding information that includes specifying a digital value and providing a symbol comprising a plurality of polygons meeting at a common vertex and having different, respective colors selected so as to encode the specified digital value. The use of such symbols in the particular context of display synchronization is described in PCT International Publication WO 2015/083055, whose disclosure is likewise incorporated herein by reference.

As another example, PCT International Publication WO 2012/022678 describes a visual reference tag formed from an array of cells, wherein each cell is visually distinct from all other cells in a given neighborhood and each of said cells contains a single visual cue, for example a unique color, selected from a finite number of visual cues.

SUMMARY

Embodiments of the present invention that are described hereinbelow provide improved types of computer-readable symbols, as well as methods for use of such symbols.

There is therefore provided, in accordance with an embodiment of the invention, a method for information display, which includes specifying information pertaining to a target location. The specified information is encoded in a machine-readable symbol including a set of three or more color elements, which have different, respective colors that encode a first part of the information and are contained within a non-rectangular border, which has a shape characteristic that encodes a second part of the information. The symbol is positioned in the target location.

In the disclosed embodiments, the set of color elements includes a plurality of colored regions meeting at a common vertex, wherein the different, respective colors are selected so as to encode the first part of the information as a digital value.

In some embodiments, the non-rectangular border has edges, and wherein the second part of the information is encoded by features of the edges. In one embodiment, the edges have corners in respective corner locations, and at least a portion of the second part of the information is encoded by the corner locations.

Additionally or alternatively, the second part of the information includes registration information, indicating a spatial relationship between the symbol and an object of interest in the target location. Typically, positioning the symbol includes choosing a placement and orientation of the symbol in the target location so that upon capture of an image of the target location and decoding of the symbol by a computer, the registration information indicates a coordinate of the object of interest to the computer.

Some embodiments also provide a tangible medium having a symbol provided thereon in accordance with the methods described herein.

There is also provided, in accordance with an embodiment of the invention, a method for computer input, which includes capturing an image at a target location that includes a machine-readable symbol that encodes information pertaining to the target location and includes a set of three or more color elements, which have different, respective colors and are contained within a non-rectangular border. The captured image is processed in a computer in order to extract the encoded information by decoding a first part of the information that is encoded in the colors of the color elements and decoding a second part of the information that is encoded in a shape characteristic of the non-rectangular border.

In a disclosed embodiment, decoding the second part of the information includes detecting the locations of corners of the border and decoding a relation between the corner locations and the color elements.

In another embodiment, the second part of the information includes registration information, indicating a spatial relationship between the symbol and an object of interest in the target location, and processing the captured image further includes selecting a region of the image to process responsively to the registration information, and extracting additional data from the selected region.

Additionally or alternatively, processing the captured image further includes deriving one or more image quality parameters from the machine-readable symbol as it appears in the captured image, and enhancing the captured image responsively to the image quality parameters. Typically, the one or more image quality parameters are selected from a group consisting of white balance, image sharpness, image brightness, and signal/noise ratio.

There is additionally provided, in accordance with an embodiment of the invention, apparatus for computer input, including a camera, which is configured to capture an image at a target location that includes a machine-readable symbol that encodes information pertaining to the target location and includes a set of three or more color elements, which have different, respective colors and are contained within a non-rectangular border. A processor is configured to process the captured image in order to extract the encoded information by decoding a first part of the information that is encoded in the colors of the color elements and decoding a second part of the information that is encoded in a shape characteristic of the non-rectangular border.

There is further provided, in accordance with an embodiment of the invention, a computer software product, including a computer-readable medium in which program instructions are stored, which instructions, when read by a computer, cause the computer to receive an image of a target location that includes a machine-readable symbol that encodes information pertaining to the target location and includes a set of three or more color elements, which have different, respective colors and are contained within a non-rectangular border, and to process the captured image in order to extract the encoded information by decoding a first part of the information that is encoded in the colors of the color elements and decoding a second part of the information that is encoded in a shape characteristic of the non-rectangular border.

There is moreover provided, in accordance with an embodiment of the invention, a method for information display, which includes specifying information pertaining to an object of interest. The specified information is encoded in a machine-readable symbol including a first plurality of colored regions meeting at a second plurality of common vertices, wherein the different, respective colors are selected so as to encode the specified information as a digital value. The symbol is positioned in a placement and orientation relative to the object of interest so that upon capture of an image of the symbol by a computer, respective locations of the second plurality of the vertices in the image indicate to the computer a coordinate of the object of interest.

There is furthermore provided, in accordance with an embodiment of the invention, a method for computer input, which includes capturing an image that includes an object of interest and a machine-readable symbol that includes a first plurality of colored regions meeting at a second plurality of common vertices, which encode information pertaining to the object of interest as a digital value. The captured image is processed in a computer in order to extract the digital value by decoding the colors of the color elements. A region of the image is selected responsively to registration information provided by respective locations of the second plurality of the vertices, and additional data is extracted from the selected region of the image.

In one embodiment, extracting the additional data includes applying optical character recognition to detect alphanumeric symbols in the selected region.

There is also provided, in accordance with an embodiment of the invention, apparatus for computer input, including a camera, which is configured to capture an image that includes an object of interest and a machine-readable symbol that includes a first plurality of colored regions meeting at a second plurality of common vertices, which encode information pertaining to the object of interest as a digital value. A processor is configured to process the captured image in order to extract the digital value by decoding the colors of the color elements, to select a region of the image responsively to registration information provided by respective locations of the second plurality of the vertices, and to extract additional data from the selected region of the image.

There is additionally provided, in accordance with an embodiment of the invention, a computer software product, including a computer-readable medium in which program instructions are stored, which instructions, when read by a computer, cause the computer to receive an image that includes an object of interest and a machine-readable symbol that includes a first plurality of colored regions meeting at a second plurality of common vertices, which encode information pertaining to the object of interest as a digital value, and to process the captured image in order to extract the digital value by decoding the colors of the color elements, to select a region of the image responsively to registration information provided by respective locations of the second plurality of the vertices, and to extract additional data from the selected region of the image.

The present invention will be more fully understood from the following detailed description of the embodiments thereof, taken together with the drawings in which:

DETAILED DESCRIPTION OF EMBODIMENTS

Figure 1:
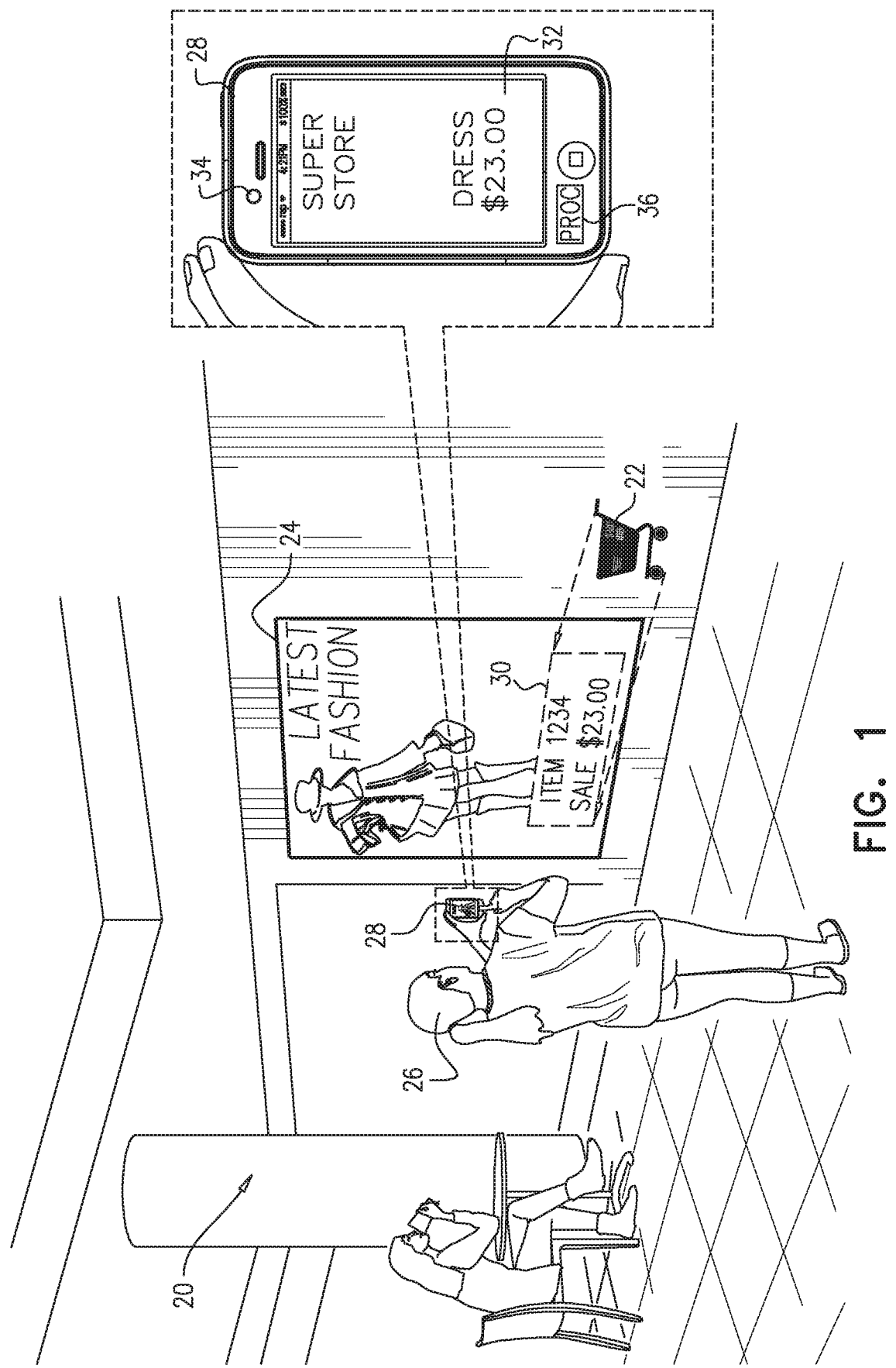
FIG. 1 is a schematic, pictorial illustration of a system for information display, in accordance with an embodiment of the present invention.

Machine-readable symbols, also referred to herein as tags, typically comprise a certain sort of pattern that is displayed on a flat medium. Most existing tags of this sort include separate fields for registration and information encoding. The registration fields contain patterns that can be identified by a computer processing the image of the tag in order to indicate the presence and possibly the orientation of a tag. The encoding field usually contains a regular arrangement of simple elements, such as bars or tiles, and the particular combination encodes the information provided by the tag. The QR code is a popular example that uses three corners for registration and dark and light squares as tiles.

The tag as a whole, and particularly the registration field, is designed to have a unique form that is easily recognizable by both humans and computers, and is unlikely to be confused by the computer with other objects in the image. At the same time, the size and placement of the tag must be such that a camera will be able to conveniently capture an image of the tag with sufficient resolution to allow error-free decoding of the encoded information. These needs for clear recognition and registration on the one hand, and high-resolution imaging on the other, impose severe constraints on the integration of the tag with other display features and other elements in the environment in which the tag is displayed.

The above-mentioned PCT International Publications WO 2013/189963 and WO 2015/083055 describe new types of machine-readable tags in which there is no separation between registration and coding fields. These tags use a tessellation of colored regions, referred to as tiles, wherein tiles touching each other are not allowed to be of the same color. In one embodiment, a tag of this sort comprises a grid of three by three tiles defining four so-called color vertex points (CVPs) at the corners of the central tile. The different colors of the three or more tiles that meet at a given vertex are chosen so as to encode a specified digital value.

Due to the color constraint, CVPs can be identified rapidly by a computer, in a robust manner, enabling both registration and decoding of the tag in an image captured by a camera even when the tag occupies only a small part of the overall image. Notwithstanding the color constraint, however, many different color combinations for the tag are still possible, and such tags can thus encode a substantial amount of information even using only a small number of tiles. For example, in the above-mentioned three by three grid, using six different colors, there are more than 120,000 unique combinations of colors, corresponding to more than two bytes of information.

Embodiments of the present invention that are described herein provide graphical symbols that combine machine-readable color tags with additional graphical features. This combination can be beneficial aesthetically in order to achieve a particular appearance, but the symbol design can also be functional: For example, integrating a color tag into a particular sort of border, such as the border of a logo or other graphical border, can help both to make the symbol more attractive to humans, who thus recognize the border, and to provide additional machine-readable information. As one aspect of providing additional information, such a symbol can function as an initial focal point for purposes of image registration, in order to assist the computer in extracting further information from the image in the vicinity of the symbol. In particular, the locations of the vertex points, as well as other features of the color elements, can provide registration information; and the vertex points of a color tag can be used for this sort of registration function even in the absence of a distinctive graphical border surrounding the tag.

Specifically, in some embodiments, a symbol of this sort provides registration information, indicating a spatial relationship between the symbol and an object of interest, thus telling the computer where in the image to search and possibly what kind of information to look for. For example the symbol could point to simple text, which can be hard to extract from large images containing many non-textual features, but is much easier to process if information on its location (and possibly orientation and type) is available.

Additionally or alternatively, other information can be encoded in machine-readable form in graphical features of the symbol, such as edges and particularly corners, which can be extracted using computerized image processing techniques. This additional information supplements the information that is encoded by the color elements within the symbol. Similar to text, but unlike bar codes, an advantage of such graphical features is that not only computers, but also humans, can interpret them.

Thus, generally speaking, the embodiments of the present invention that are described herein provide machine-readable symbols that can be detected and analyzed automatically using computerized image processing to extract information encoded by the symbol. Each such symbol comprises a set of three or more color elements, which have different, respective colors that encode a first part of the information and are contained within a non-rectangular border, which has a shape characteristic that encodes a second part of the information. Typically, each symbol encodes specified information pertaining to a target location where the symbol is positioned. Although the aforementioned CVP encoding technique is particularly well suited for use in these embodiments, the principles of the present invention are by no means limited to this particular choice of tags, and other color elements may be used in a similar fashion.

The disclosed color-based symbols have several key advantages for being combined with other image features. First, due to the unification of registration and information encoding, they are space-efficient and can be reliably detected at distances much larger than common types of tags of the same size. Second, the recognition of these symbols by computerized image processing is fast, making it feasible to reliably detect them in full-size images captured by camera-enabled devices at a speed faster than the frame rate. Third, the arrangement of vertices and other features of the symbols provides information on the orientation and also the distance from the camera to the symbol position (if the size of the symbol is known). Fourth, the outer boundaries of the outer color elements, which are bounded by the (non-rectangular) border of the symbol, can be chosen arbitrarily, as long as a minimal size of each color element is maintained. This last feature, together with the choice of color elements, affords superior flexibility in integration of the symbols with all sorts of graphical shapes and environments.

FIG. 1 is a schematic, pictorial illustration of a system 20 for information display, in accordance with an embodiment of the present invention. System 20 comprises a symbol 22, which is positioned within or in proximity to a main display 24 in a certain target location. Main display 24 may comprise, for example, a printed sign or a dynamic display, such as a video screen. Although symbol 22 is separated from display 24 for the sake of clarity in FIG. 1, in practice it may be more convenient to integrate symbol 22 into display 24, regardless of whether the display is static or dynamic.

Symbol 22 has a non-rectangular border with an iconic form—a shopping cart in this example—that conveys information to human viewers, while at the same time containing machine-readable information, as explained above. Details of symbol 22, as well as other symbols that may be used in a similar fashion, are shown in the figures that follow. Although symbol 22 is used in the example embodiment of FIG. 1 in conjunction with a promotional display, such symbols may alternatively be positioned in other sorts of target locations, in proximity to and association with other sorts of objects of interest. Further alternatively, although the pictured embodiment illustrates specifically how symbol 22 can be used in conjunction with main display 24 or other objects of interest in the environment of the symbol, the principles of the present invention may also be applied to encode information in such symbols independently of the symbol environment.

A user 26 operates a mobile computing device 28, such as a smartphone, to capture an image at the target location that includes symbol 22 and main display 24. Device 28 comprises a processor 36, along with an associated display screen 32, which also serves as a user interface. Device 28 also comprises a camera module 34 (alternatively referred to simply as a camera) and other standard components, such as a memory and communications interface (not shown). Processor 36 carries out the functions that are described herein under the control of software, such as an application program ("app"). This software may be downloaded to device 28 in electronic form, over a network, for example. Additionally or alternatively, the software may be provided and/or stored in device 28 on tangible, non-transitory memory media, such as optical, electronic or magnetic memory.

Processor 36 processes the image captured by camera 34 and automatically recognizes the internal arrangement of color elements in symbol 22 as a structure that contains encoded information. Processor 36 reads the colors and vertex locations in the image of symbol 22 and decodes the information that they encode. In addition, processor 36 decodes further information that is encoded in the shape characteristics of the non-rectangular border of symbol 22.

In the pictured example, the information encoded in symbol 22 comprises registration information, indicating a spatial relationship between symbol 22 and an object of interest in the target location, such as a text area 30 within main display 24. Specifically, the placement and orientation of symbol 22 are chosen so that when device 28 captures and processes an image of the target location and decodes symbol 22, the registration information encoded by symbol 22 indicates to processor 36 the coordinates of text area 30 (or of some other object of interest). Thus, after decoding symbol 22, processor 36 is able to apply the registration information in selecting the appropriate region of the image to process and to extract additional data from the selected region.

In the pictured example, processor 36 follows the cues provided by symbol 22 in applying optical character recognition (OCR) to detect alphanumeric symbols in text area 30. Device 28 is thus able to automatically extract, display and store specific textual and/or numeric information of interest to user 26 without incurring the burden of analyzing the entire image of main display 24 to find the desired information.

Additionally or alternatively, when the expected colors of the color elements in symbol 22 are well defined and known to an appropriate application running on device 28, processor 36 can derive image quality parameters by processing the symbol as it appears in the image captured by camera 34. In this manner, for example, processor 36 can detect deviations in the color spectrum of the image due to lighting variations, as well as degradation of the sharpness and/or contrast of edges in the image. Processor 36 can then apply these image quality parameters in enhancing the captured image. For example, processor 36 can adjust the white balance of the image to correct for color deviations in the image symbol 22, as well as enhancing image sharpness, image brightness, and/or signal/noise ratio.

Figure 2:
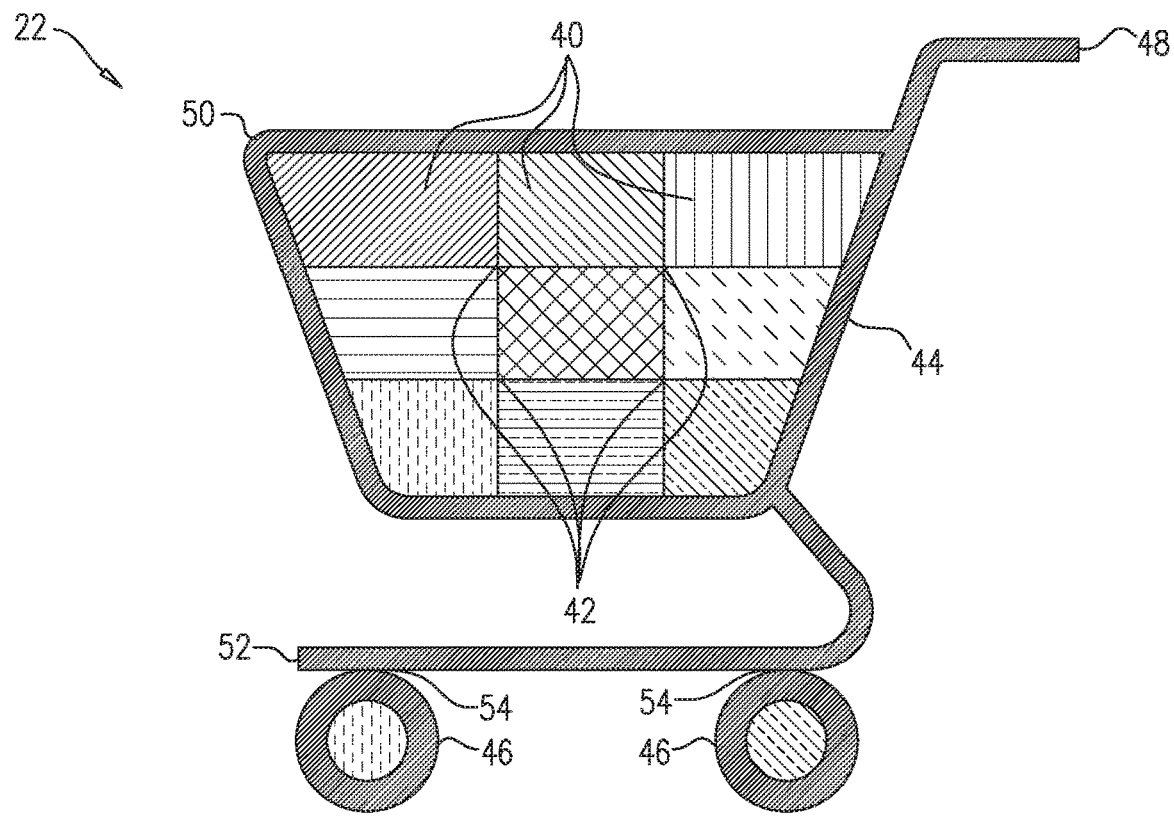
FIGS. 2 and 3 are schematic representations of multi-color computer-readable symbols, in accordance with embodiments of the present invention.

FIG. 2 is a schematic representation of multi-color computer-readable symbol 22, in accordance with an embodiment of the present invention. Symbol 22 in the pictured example comprises a 3×3 grid of color elements 40 (also referred to as tiles), contained within a border 44. Alternatively, the symbols used in this and other embodiments of the present invention may comprise grids of other dimensions (for example, 3×2) and may alternatively comprise color elements of other shapes. Border 44 in this example has the shape of a shopping cart, to indicate to the human viewer that symbol 22 contains information relating to goods for sale, but alternatively, a wide range of different border shapes may be used to convey other sorts of information, both to the human viewer and to computerized devices analyzing images of symbol 22.

The arrangement of color elements 40 in symbol 22 encodes information as a specified digital value in a manner similar to that described in the above-mentioned PCT publications WO 2013/182963 and WO 2015/083055. Briefly stated, each color is assigned a three-bit code, which comprises respective binary values representing three primary color components (red, green and blue) of the colors of the regions. The individual digital codes of color elements 40 surrounding each vertex 42 in symbol 22 are combined, typically by concatenation, to give a corresponding digital value. When the symbol comprises multiple vertices 42, as in the present example, the specified digital value is obtained by combining (again, typically by concatenation) the digital values encoded by the individual vertices.

As described in WO 2013/182963, the colors of elements 40 may conveniently be selected from a color group comprising red, green, blue, cyan, magenta and yellow, with corresponding three-bit codes (1,0,0), (0,1,0), (0,0,1), (0,1,1), (1,0,1) and (1,1,0), respectively. This color group can advantageously be extended by the inclusion of black and white, having respective three-bit codes (0,0,0) and (1,1,1). In addition to the information that they encode, these well-defined colors can also be used in enhancing white balance and other aspects of image quality, as noted above.

Beyond the intuitive information that border 44 conveys to the human viewer, the shape characteristics of border 44 encode further information that can be decoded by processor 36 using appropriate image processing techniques. These shape characteristics include, in the present example, outlying features 46, such as circles representing wheels, which may contain additional color elements as shown in FIG. 2. More generally, the shape characteristics of border 44 are expressed in terms of features of the edges of the border, and particularly in the locations of corners, such as corners 48, 50, 52 and 54 in the figure. The corner locations can both encode additional digital values and can serve as additional registration marks, for example in pointing to text area 30 (FIG. 1). Alternatively, this registration function of can be carried out solely on the basis of vertices 42 or on the basis of a combination of vertices 42 with features of border 44.

Various methods that are known in the art may be applied in detecting the corners of border 44. Useful methods for this purpose are described, for example, by Moravec, in "Obstacle Avoidance and Navigation in the Real World by a Seeing Robot Rover," Tech Report CMU-RI-TR-3, Carnegie-Mellon University, Robotics Institute (1980); by Harris and Stephens, in "A combined corner and edge detector," *Proceedings of the 4th Alvey Vision Conference*, pages 147-151 (1988); by Shi and Tomasi, in "Good Features to Track," *9th IEEE Conference on Computer Vision and Pattern Recognition* (1994); and by Tomasi and Kanade, in "Detection and Tracking of Point Features," *Pattern Recognition* 37, pages 165-168 (2004). These methods provide a score for each pixel in an image that indicates the likeliness of the pixel to be part of a corner, which is defined as a point in the image whose vicinity varies under translations in all directions.

For this purpose, for example, processor 36 may compute and apply the Harris matrix, in the following form:

$$A = \sum_u \sum_v w(u,v) \begin{bmatrix} I_x^2 & I_x I_y \\ I_x I_y & I_y^2 \end{bmatrix} = \begin{bmatrix} \langle I_x^2 \rangle & \langle I_x I_y \rangle \\ \langle I_x I_y \rangle & \langle I_y^2 \rangle \end{bmatrix}$$

The elements of the matrix are computed as weighted sums of the partial derivatives $I_x$ and $I_y$ of the image, taken over the area covered by the image coordinates (u,v) with weights w(u,v). This matrix has two large eigenvalues at any corner in the image. Processor 36 typically computes the corner scores as functions of the trace and the determinant of A in order to avoid the explicit computation of the eigenvalues. The points along border 44 that have the highest corner scores are identified as corners 48, 50, 52, 54, etc.

In one embodiment of the present invention, symbol 22 encodes information in the corners of border 44 using an encoding scheme based on a grid defined by vertices 42. The central color element 40 of the symbol, surrounded by vertices 42, defines the center of this grid, to which we refer as (0,0). The surrounding corner elements 40 have coordinates (±1,±1) while the side elements correspond to (0,±1) and (±1,0). Any of these eight peripheral color elements can have a corner in its external border, and possibly more than one corner. In order to allow for robust corner detection, even if a color element contains relatively few pixels, corner encoding can be binary, meaning that a color element either contains at least one corner or not for purposes of the encoded value. For robust detection (and also to help the human eye to perceive the boundary of the symbol), processor 36 applies corner detection to the overall intensity in the three channels (I=R+G+B).

Given the above definitions, a color element is "cornered" if the maximal value of the score derived from the Harris matrix from any of the pixels in the color element is above a certain threshold, and the color element is "smooth" otherwise. "Cornered" elements are assigned the binary value "1", while "smooth" elements get the value "0" (or vice versa). The threshold can be determined from the central color element (which is known to be smooth), for example by setting the threshold to be several standard deviations above the mean value of the corner score values of the pixels of the central element. This sort of encoding thus can add an additional byte of information to a given symbol.

Although symbol 22 comprises only nine color elements 40 (corresponding to rectangular tiles of dimensions indicated by the central element), at least the surrounding sixteen tiles (those for which at least one coordinate is ±2) can be naturally integrated into the detection and processing scheme applied by processor 36. Thus, in addition to the eight binary corner values of the eight peripheral tiles in the 3×3 matrix of color elements, analysis of corners in the sixteen additional tiles in the immediate vicinity can provide an additional two bytes. The encoding scheme can also include corners and other features in additional boundary layers, but for robust information decoding it is advantageous to consider no more than the first two layers of surrounding tiles.

The constraints on the shape of a logo (such as that shown in FIG. 2) may result in only a limited number of values that can be encoded by image corners, depending on the interaction between the shape of border 44 and the locations of color elements 40. Even so, the use of corners allows for significantly expanding the range of encoded information, since the same color code can be reused if combined with different corner profiles. As noted above, corners can also be used in registration of the symbol with objects of interest in its vicinity.

Processor 36 may analyze and apply other image features in decoding symbol 22, in addition to or instead of looking for corners. For example, the processor can evaluate whether a tile contains an edge within its rectangular (or other polygonal) area, and/or count corners or edges within each tile, thereby creating a base larger than two. Additionally or alternatively, processor 36 can apply corner or edge detection on each individual color channel independently. The above digital encoding and decoding features can be used in conjunction with or separately from the use of symbol 22 in geometrical registration of the symbol with objects of interest, such as text area 30 in FIG. 1.

Figure 3:
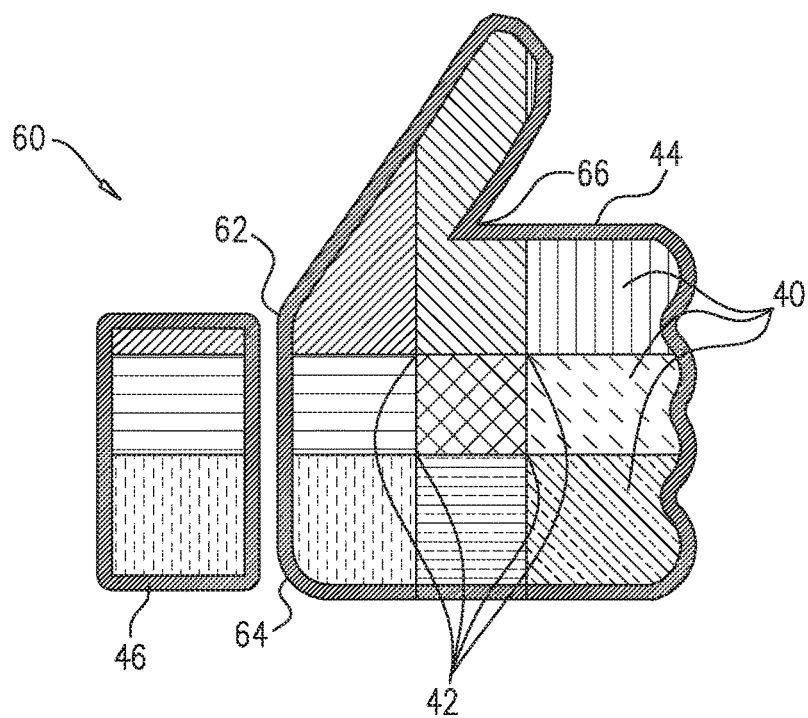

FIG. 3 is a schematic representation of a multi-color computer-readable symbol 60, in accordance with another embodiment of the present invention. In this example, border 44 has the form of a social network icon, and could cue user 26 to connect to a social network page by capturing an image of symbol 60. Like symbol 22, symbol 60 includes outlying feature 46 with its own color regions, as well as corners 62, 64, 66, etc. Substantially any graphical symbol that can be represented in outline form, including various sorts of company logos, can be used to encode computer-readable information in this manner.

Figure 4:
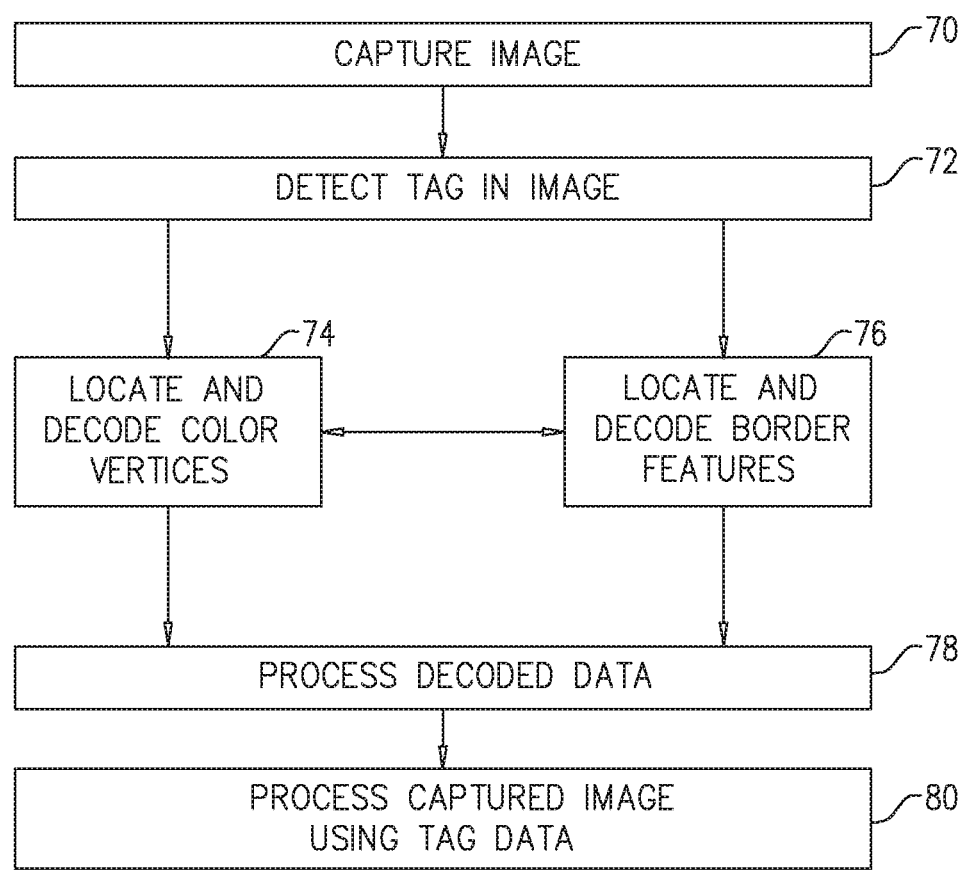
FIG. 4 is a flow chart that schematically illustrates a method for decoding a multi-color symbol, in accordance with an embodiment of the invention.

FIG. 4 is a flow chart that schematically illustrates a method for decoding a multi-color symbol, in accordance with an embodiment of the invention. The method is described, for the sake of convenience and clarity, with reference to the elements of system 20, as shown in FIG. 1, and the features of this system and the symbols that are described above. The principles of this method, however, may equally be implemented using other sorts of symbols that comprise multiple different color elements in a non-rectangular border, in a wide range of different application scenarios, and using any suitable sorts of image capture and computing devices. All such alternative implementations are considered to be within the scope of the present invention.

Camera 34 in device 28 captures an image of the target location, at an image capture step 70. As shown in FIG. 1, the image typically comprises both symbol 22 and another object or objects of interest, such as main display 24. Processor 36 processes the captured image and detects symbol 22, at a tag detection step. The unique form and color distribution of color elements 40 in symbol 22 enables the processor to detect its location in the image quickly and efficiently. For example, processor 36 can identify adjacent areas in the image having different primary colors, and then can test the colors to determine whether they meet the criteria for adjacent regions in a tag.

Having located symbol 22 in the image, processor 38 finds vertices 42 and extracts the colors of elements 40 surrounding each vertex in order to decode the digital information that they encode, at a vertex decoding step 74. As noted earlier, processor 38 typically concatenates the values of the individual vertices in order to extract the complete data value.

In addition, processor 38 locates and decodes the features of border 44, at a border decoding step 76. In this step, as explained above, processor 38 may locate the corners of the border and decode the digital values that they represented. Additionally or alternatively, the processor may analyze and decode other edge features. Further additionally or alternatively, the shape and other features of border 44 may assist processor 38 in registering symbol 22 with main display 24 (or other objects in the target location).

Processor 38 processes the decoded data, at an information processing step 78. The information thus decoded can instruct processor 38 with regard to further processing of the captured image, at an image analysis step 80. For example, symbol 22 can indicate to processor 38 the location of a region of interest, such as text area 30, in the image. Processor 38 can then apply OCR to the region of interest in order to extract alphanumeric data, and can combine this data with the information provided by symbol 22 in interpreting, displaying, and storing the information. Alternative schemes for extraction and processing of image information based on symbols of this sort will be apparent to those skilled in the art and are considered to be within the scope of the present invention.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for information display, comprising:
   specifying information pertaining to an object of interest;
   encoding the specified information in a machine-readable symbol comprising a set of three or more color elements, which have different, respective colors that encode a first part of the information and are contained within a non-rectangular, distinctive graphical border, which has a shape characteristic that encodes a second part of the information, which comprises registration information, indicating a spatial relationship between the symbol and the object of interest; and positioning the symbol in proximity to the object of interest.

2. The method according to claim 1, wherein the set of color elements comprises a plurality of colored regions meeting at a common vertex, wherein the different, respective colors are selected so as to encode the first part of the information as a digital value.

3. The method according to claim 1, wherein the non-rectangular border has edges, and wherein the second part of the information is encoded by features of the edges.

4. The method according to claim 3, wherein the edges have corners in respective corner locations, and wherein at least a portion of the second part of the information is encoded by the corner locations.

5. The method according to claim 1, wherein positioning the symbol comprises choosing a placement and orientation of the symbol in a target location so that upon capture of an image of the target location and decoding of the symbol by a computer, the registration information indicates a coordinate of the object of interest to the computer.

6. A computer software product, comprising a non-transitory computer-readable medium in which program instructions are stored, which instructions, when read by a computer, cause the computer to receive an image of an object of interest that includes together with a machine-readable symbol, which is located in proximity to the object of interest and encodes information pertaining to the object of interest and comprises a set of three or more color elements, which have different, respective colors and are contained within a non-rectangular distinctive graphical border, and to process the captured image in order to extract the encoded information by decoding a first part of the information that is encoded in the colors of the color elements and decoding a second part of the information that is encoded in a shape characteristic of the non-rectangular distinctive graphical border and comprises registration information, indicating a spatial relationship between the symbol and the object of interest.

7. The product according to claim 6, wherein the set of color elements comprises a plurality of colored regions meeting at a common vertex, wherein the different, respective colors are selected so as to encode the first part of the information as a digital value.

8. The product according to claim 6, wherein the non-rectangular border has edges, and wherein the second part of the information is encoded by features of the edges.

9. The medium according to claim 8, wherein the edges have corners in respective corner locations, and wherein at least a portion of the second part of the information is encoded by the corner locations.

10. The product according to claim 6, wherein the symbol is positioned and oriented in a target location so that upon capture of an image of the target location and decoding of the symbol by the computer, the registration information indicates a coordinate of the object of interest to the computer.

* * * * *